(12) United States Patent
McMillen (10) Patent No.: US 6,880,424 B2
(45) Date of Patent: Apr. 19, 2005

(54) APPARATUS FOR TELESCOPING ACTUATOR

(75) Inventor: Robert McMillen, Tecumseh (CA)

(73) Assignee: L & P Property Management Company, South Gate, CA (US)

( * ) Notice: Subject to any disclaimer, the term of this patent is extended or adjusted under 35 U.S.C. 154(b) by 251 days.

(21) Appl. No.: 10/008,896

(22) Filed: Dec. 7, 2001

(65) Prior Publication Data

US 2003/0106970 A1 Jun. 12, 2003

(51) Int. Cl.[7] ............................. F16C 1/10; B23P 11/00
(52) U.S. Cl. ................................... 74/500.5; 29/525.11
(58) Field of Search ............................. 74/500.5, 501.6, 74/505; 29/525.11, 525.12, 428; 248/161; 5/168; 297/463.1, 410; 470/10

(56) References Cited

U.S. PATENT DOCUMENTS

| 823,971 A | 6/1906 | Remondy |
| 2,338,271 A | 1/1944 | Ulanet |
| 3,631,951 A | 1/1972 | Quenneville ................ 192/8 C |
| 3,726,370 A | 4/1973 | Hubbard, Jr. ................ 192/8 C |
| 3,759,358 A | 9/1973 | Quenneville ................ 192/8 C |
| 3,796,292 A | 3/1974 | Harrison ..................... 192/8 C |
| 3,876,184 A | 4/1975 | Eudy ........................ 254/150 R |
| 4,014,422 A | 3/1977 | Morishita ................. 192/67 R |
| 4,316,631 A | 2/1982 | Lenz et al. .................. 297/284 |
| 4,354,709 A | 10/1982 | Schuster ..................... 297/284 |
| 4,494,709 A | 1/1985 | Takada ..................... 242/107.6 |
| 4,561,606 A | 12/1985 | Sakakibara et al. .......... 242/107 |
| 4,614,257 A | 9/1986 | Harada et al. ............... 192/8 C |
| 4,778,138 A | 10/1988 | Yamada ....................... 248/421 |
| 4,786,110 A | 11/1988 | Mahling et al. ............. 297/362 |
| 4,817,771 A | 4/1989 | Iten ............................. 192/16 |
| 5,010,780 A | 4/1991 | Hatfield ................. 74/501.5 R |
| 5,050,930 A | 9/1991 | Schuster et al. ............. 257/284 |
| 5,080,434 A | 1/1992 | Locher ........................ 297/301 |
| 5,186,412 A | 2/1993 | Park ............................ 242/245 |
| 5,197,780 A | 3/1993 | Coughlin .................. 297/284.7 |
| 5,211,368 A | 5/1993 | Kitamura .................. 248/292.1 |
| 5,217,278 A | 6/1993 | Harrison et al. .......... 297/284.7 |
| 5,248,017 A | 9/1993 | Schwarzbich ............... 192/8 R |
| 5,382,076 A | 1/1995 | Scheck et al. ........... 297/354.12 |
| 5,397,164 A | 3/1995 | Schuster et al. .......... 297/284.1 |
| 5,449,219 A | 9/1995 | Hay et al. ................. 297/284.4 |
| 5,507,559 A | 4/1996 | Lance |
| 5,522,488 A | 6/1996 | Schwarzbich ............... 192/8 R |
| 5,567,010 A | 10/1996 | Sparks ..................... 297/284.4 |
| 5,567,011 A | 10/1996 | Sessini ..................... 297/284.7 |

(Continued)

FOREIGN PATENT DOCUMENTS

| DE | 29 47 472 | 8/1980 | ............ B60N/1/00 |
| EP | 0 006 840 B1 | 2/1982 | ............ A47C/23/00 |
| EP | 0 322 535 A1 | 7/1989 | ............ A47C/7/46 |
| EP | 0 885 164 B1 | 7/2002 | ............ B65H/75/30 |
| FR | 2522511 | * 9/1983 | |

Primary Examiner—John C. Hong
(74) Attorney, Agent, or Firm—Dennis J. M. Donahue, III; Grant D. Kang; Husch & Eppenberger LLC (57) ABSTRACT

An ergonomic device actuator has a housing and a nut disposed to rotate within the housing. The nut has right handed threads at a first end and left handed threads at a second end. A first lead screw has right handed threads and is extendingly engaged with the first end of the nut. A second lead screw has left handed threads and is engaged with the second end of the nut to extend in the opposite direction from the first lead screw. A seat in the first lead screw is adapted to anchor a tension cable wire end axially with the lead screws and a collar on the second lead screw is adapted to anchor a tension cable sleeve end axially with the lead screws. Thereby, rotation of the nut drives the first lead screw and the second lead screw apart, tensioning the tension cable by urging the tension cable wire end apart from the tension cable sleeve end, and actuating an attached ergonomic device.

26 Claims, 10 Drawing Sheets

U.S. PATENT DOCUMENTS

| | | | |
|---|---|---|---|
| 5,593,210 A | 1/1997 | Schwarzbich | 297/361.1 |
| 5,609,394 A | 3/1997 | Ligon, Sr. et al. | 297/284.4 |
| 5,638,722 A | 6/1997 | Klingler | 74/502.4 |
| 5,681,005 A | 10/1997 | Ligon, Sr. et al. | 242/394.1 |
| 5,704,687 A | 1/1998 | Klingler | 297/284.4 |
| 5,769,491 A | 6/1998 | Schwarzbich | 297/284.4 |
| 5,794,479 A | 8/1998 | Schwarzbich | 74/143 |
| 5,797,652 A | 8/1998 | Darbyshire | |
| 5,842,659 A | 12/1998 | Ligon, Sr. et al. | 242/394.1 |
| 6,045,185 A | 4/2000 | Ligon, Sr. et al. | 297/284.4 |
| 6,050,641 A | 4/2000 | Benson | 297/284.4 |
| 6,053,064 A | 4/2000 | Gowing et al. | |
| 6,158,300 A | 12/2000 | Klingler | 74/526 |
| 6,178,838 B1 | 1/2001 | Schwarzbich | 74/143 |
| 6,227,617 B1 | 5/2001 | von Möller | 297/284.4 |
| 6,230,867 B1 | 5/2001 | Schwarzbich | 192/223.2 |
| 6,238,123 B1 | 5/2001 | Schwarzbich | 403/45 |
| 6,345,549 B1 | 2/2002 | Lance | 7/500.5 |

* cited by examiner

APPARATUS FOR TELESCOPING ACTUATOR

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

This invention relates generally to tension cable actuators for ergonomic devices such as lumbar supports.

2. Related Art

Ergonomic supports for seats, especially lumbar supports for automobile seats, are frequently moved into supporting positions from flat positions by means of tension cables, such as Bowden cables. Bowden cables are simple, coaxial mechanical devices wherein a wire slides axially through a sleeve or conduit. Manufactures of moveable devices that support the weight of a seat passenger, especially devices designed to operate in dynamic tension, find that Bowden cables are an efficient way to apply traction to the moving parts of the ergonomic device. A Bowden cable sleeve end is anchored to one part of the ergonomic device, and the Bowden cable wire end to another part of the moving device. The two elements can be anchored to different portions of a single moving part, as in the case of an arching pressure surface that slides along guide rails. Alternatively, either the sleeve end or the wire end can be anchored to a non-moving portion, such as the housing of a push paddle type support, while the other element is anchored to the moving part of the device, such as the extending push paddle itself. When anchored, drawing the Bowden cable wire through the Bowden cable sleeve causes the moving parts of an ergonomic support device to travel from a relaxed, non-supporting or flat position to a tensioned, supporting position such as a bowed arch or an extended paddle.

Traction is applied to draw the wire of a Bowden cable through the sleeve of a Bowden cable by a variety of means which act on the end of the Bowden cable opposite the ergonomic device. For more expensive models of lumbar support, an electric motor is used. For devices to be installed in more economical seats, mechanical actuators are used. Typical prior art mechanical actuators anchored the Bowden cable sleeve to a stationary housing and anchored the Bowden cable wire to a moving nut threading into the housing. Turning the nut so that the threads extended it out of the housing had the effect of drawing the Bowden cable wire axially out of the Bowden cable sleeve at the actuator end. This action was translated to the ergonomic device end of the Bowden cable in order to put tension on the moving parts of the ergonomic device and bring it into a tensioned, supporting position. A typical lumbar support for a typical automobile seat travels from flat to an arched or extended position that is displaced as much as 50 mm from the flat position. Prior art manual screw type actuators required a passenger to make anywhere from four to seven complete turns of the screw nut in order to take the lumbar support through its entire range of travel.

Highly competitive markets for automotive seats and furniture place a premium on optimization of comfort and convenience for seat occupants. There is need in the industry for a manual actuator that extends an ergonomic support device through its range of travel with fewer turns of the actuator nut by the passenger. There is also a continuing need in the industry for reducing the complication of assemblies, reducing packaging size, reducing cost, and increasing durability.

SUMMARY OF THE INVENTION

The present invention is a manual, screw type tension cable actuator that moves the connected ergonomic device through its full range of travel using half as many turns as required by prior art actuators. By requiring fewer turns, the device is more convenient for the seat passenger.

The task of the actuator is achieved by sliding the end of the Bowden cable wire axially out of the end of the Bowden cable sleeve. Accordingly, any device that moves the wire end and the sleeve end apart from one another applies the tension necessary to actuate the ergonomic device at other end of the Bowden cable. Prior art mechanical screw type actuators held the Bowden cable sleeve end stationary while drawing the Bowden cable wire end axially out of the sleeve. The present invention applies force in two directions: drawing the Bowden cable wire outward, and pushing the Bowden cable sleeve inward simultaneously.

The present invention has two lead screws threaded in opposite directions. Both lead screws are held within a coaxial nut which also has on its inside diameter two sets of threads running in opposite directions. Turning the nut in a first direction moves both lead screws outward and apart from one another. Turning the nut in the opposite direction moves both lead screws inward or toward each other. The entire device is encapsulated in a housing.

The first lead screw has the Bowden cable wire end anchored to it. The second lead screw has the Bowden cable sleeve anchored to it. Since the nut drives both lead screws apart simultaneously, the nut also drives the Bowden cable elements anchored to the screws apart simultaneously. A single turn of the nut therefore achieves twice the separation travel between the wire end and the sleeve end as was achieved by the prior art, single screw manual actuator.

An alternative embodiment of the present invention decreases the size of the actuator package and profile by telescoping one of the lead screws into an inside channel of the other lead screw. This conserves space both within and without the seat by keeping the manual actuator compact.

In all embodiments, each lead screw has an anchor for an element of the tensioning cable. In the case of the Bowden cable, a first lead screw will have an anchor having a wide concavity for receiving a wire end boss, and a narrower neck for sliding insertion of the wire itself during assembly. The other lead screw will have a collar and slot for insertion and seating of the Bowden cable sleeve end. Preferably, the second lead screw also has a slot having both a narrow and a wide aspect, for insertion of the Bowden cable wire end and its anchor boss. The second lead screw is hollow cylindrically along its axis so that the Bowden cable wire end can be drawn axially through it and then anchored to the other lead screw. Alternatively, the first lead screw may have an extension to be inserted through the axis of the second lead screw far enough to receive anchoring of the Bowden cable wire end. Accordingly, turning the nut and separating the two lead screws also effectively separates the Bowden cable wire end from the Bowden cable sleeve end, creating the desired traction at the other end of the Bowden cable.

Further features and advantages of the present invention, as well as the structure and operation of various embodiments of the present invention, are described in detail below, with reference to the accompanying drawings.

DETAILED DESCRIPTION OF THE PREFERRED EMBODIMENTS

Figure 1:
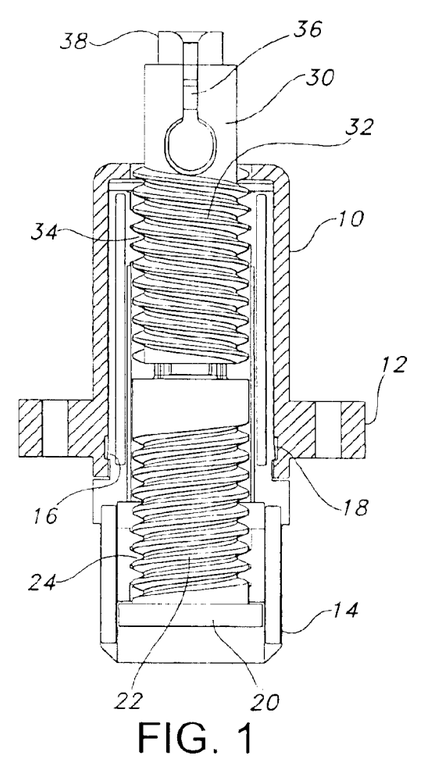
FIG. 1 is a cut away side view of the actuator in a closed, untensioned position.

Referring to the accompanying figures wherein like reference numbers indicate like elements, FIG. 1 is a cut away side view of the actuator of the present invention. Housing 10 has two flanges, 12 with holes for anchoring screws so that the unit may be mounted in a seat frame. Nut 14 rotates within housing 10. Ring 16 on housing 14 seats within anular detent 18 in housing 10, retaining nut 14 in housing 10. Outside lead screw 20 has threads 22 which engage with corresponding threads 24 on the inside diameter of the outer end of nut 14. Inside lead screw 30 has threads 32 which engage corresponding threads 34 on the inside aspect of the inner end of nut 14.

Inside lead screw 30 also has a slot 36 for insertion of a Bowden cable wire end bullet for anchoring the wire.

Outside lead screw 20 also has a shaft 40 which extends inward and inserts into the hollow cylindrical core inside lead screw 30.

Figure 2:
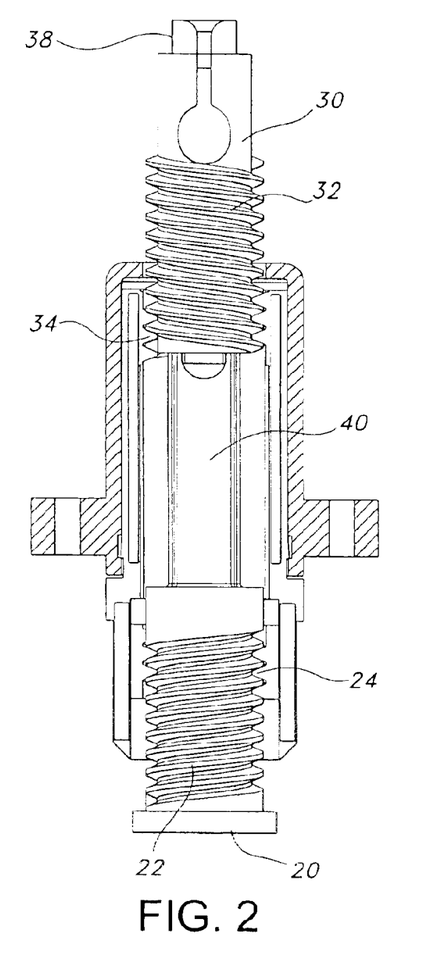
FIG. 2 is a cut away side view of the actuator in an expanded, tensioned position.

FIG. 1 shows the actuator in its untensioned or relaxed position. In this position, the ergonomic device, for example a lumbar support, would be in a non-weight supporting or flat position. FIG. 2 is also a cut away side view of the actuator. FIG. 2 is in the extended or tensioned position, corresponding to an extended, weight supporting position for the lumbar support on the other end of the Bowden cable. In FIG. 2, the outside lead screw 20 is in its extended position such that its outside aspect is moved farther outward, beyond the limits of the nut 14. The inner lead screw 30 has also been extended to project in the inward direction (relative to the seat) beyond the limit of nut 14 in housing 10.

Outer lead screw 20 has threads 22 engaging nut threads 24, which threads are in a first direction. Whether this direction is right or left handed is immaterial, provided that the outer lead screw is threaded in the opposite direction from the threads 32 and 34 of inner lead screw 30 and the inner end of nut 14. Thus configured, rotation of the nut 14 causes both lead screws 20 and 30 to extend outwards relative to housing 10 and nut 14, that is, in opposite directions.

FIG. 2 depicts the outer lead screw 20 and inner lead screw 30 in their extended positions after having been translated to those extended positions by rotation of nut 14. In FIG. 2 shaft 40 can be more clearly seen.

Figure 3:
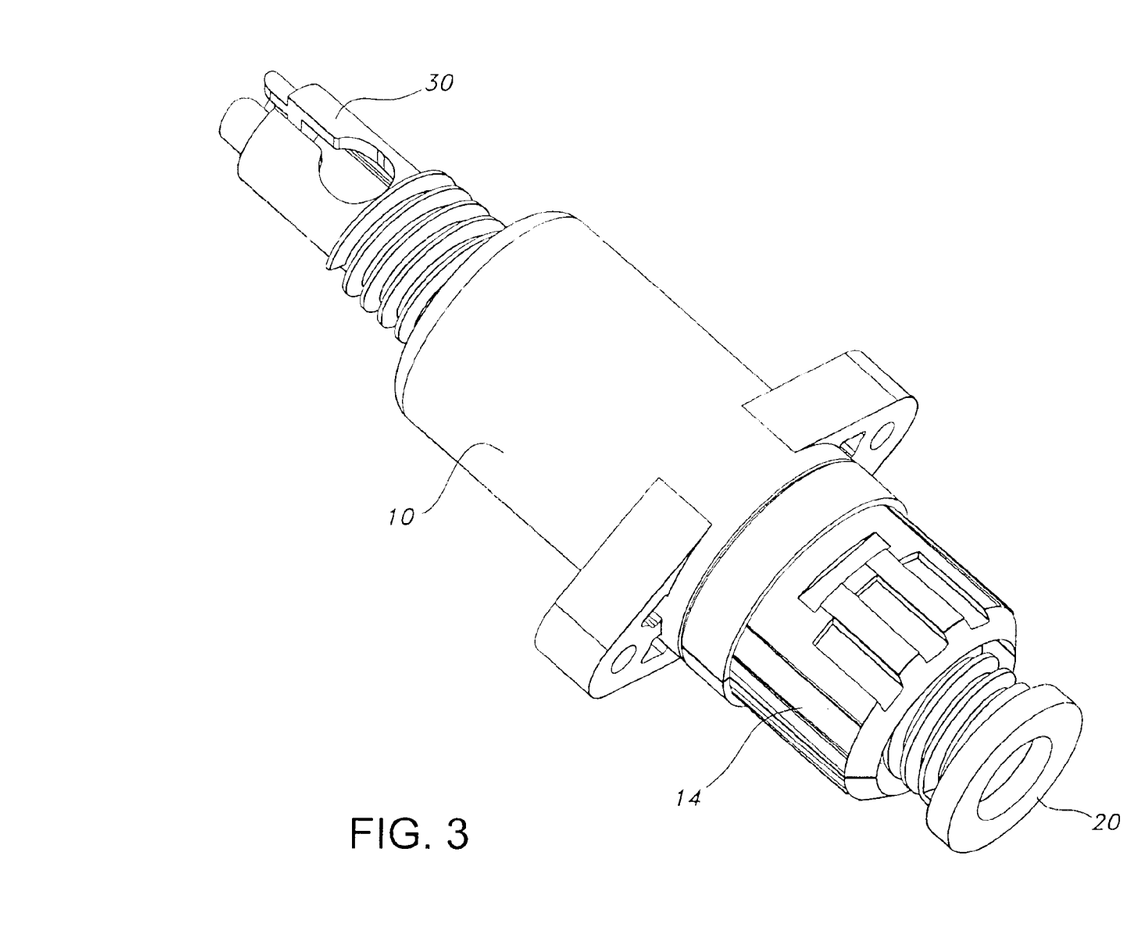
FIG. 3 is a perspective view of the assembled actuator.
Figure 4:
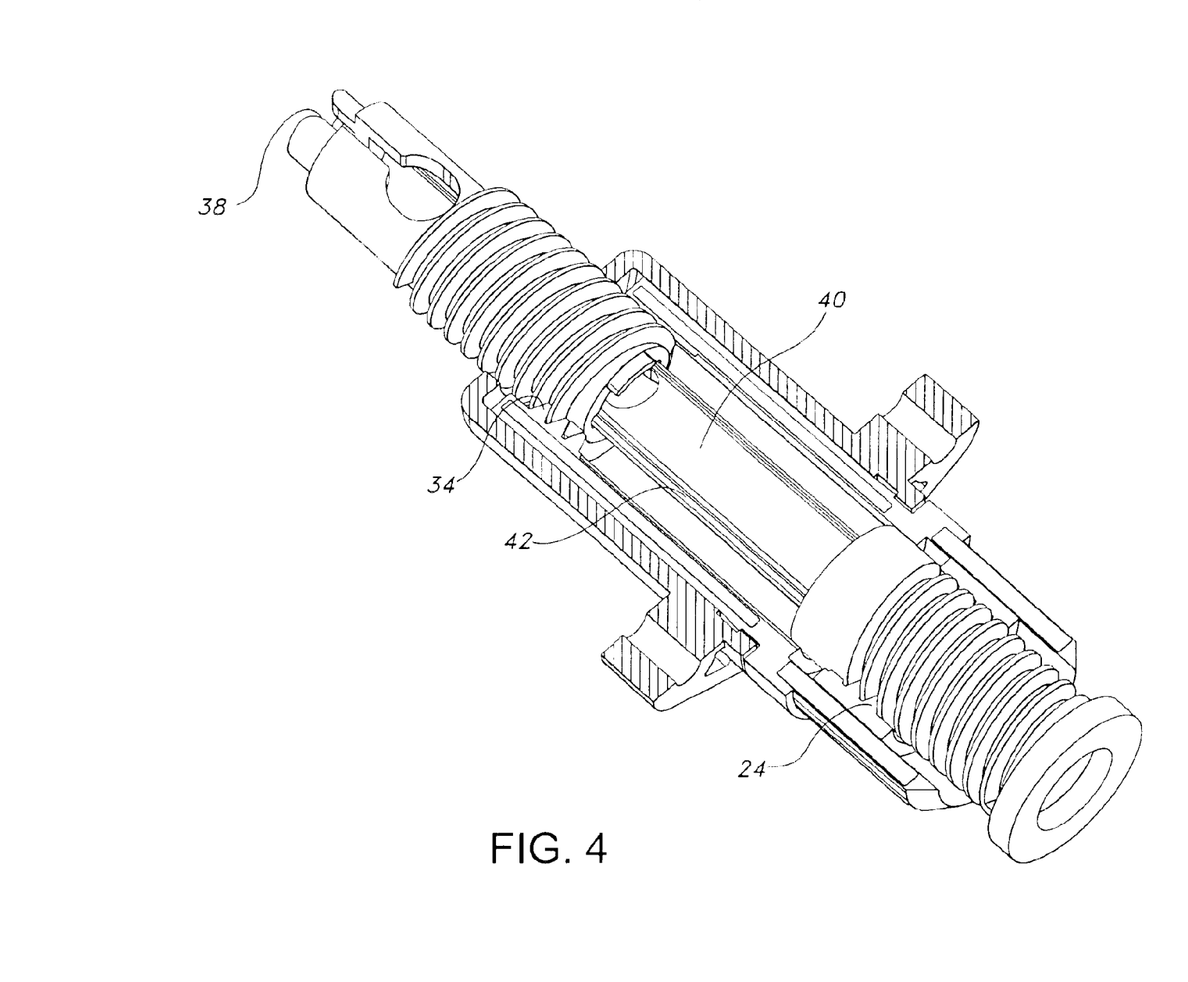
FIG. 4 is a cut away perspective view of the actuator.

FIG. 3 is a perspective view of the assembled actuator. FIG. 4 is a cut away perspective view of the actuator. Both FIGS. 3 and 4 show the actuator with the lead screws in their extended, tensioned position.

Figure 5:
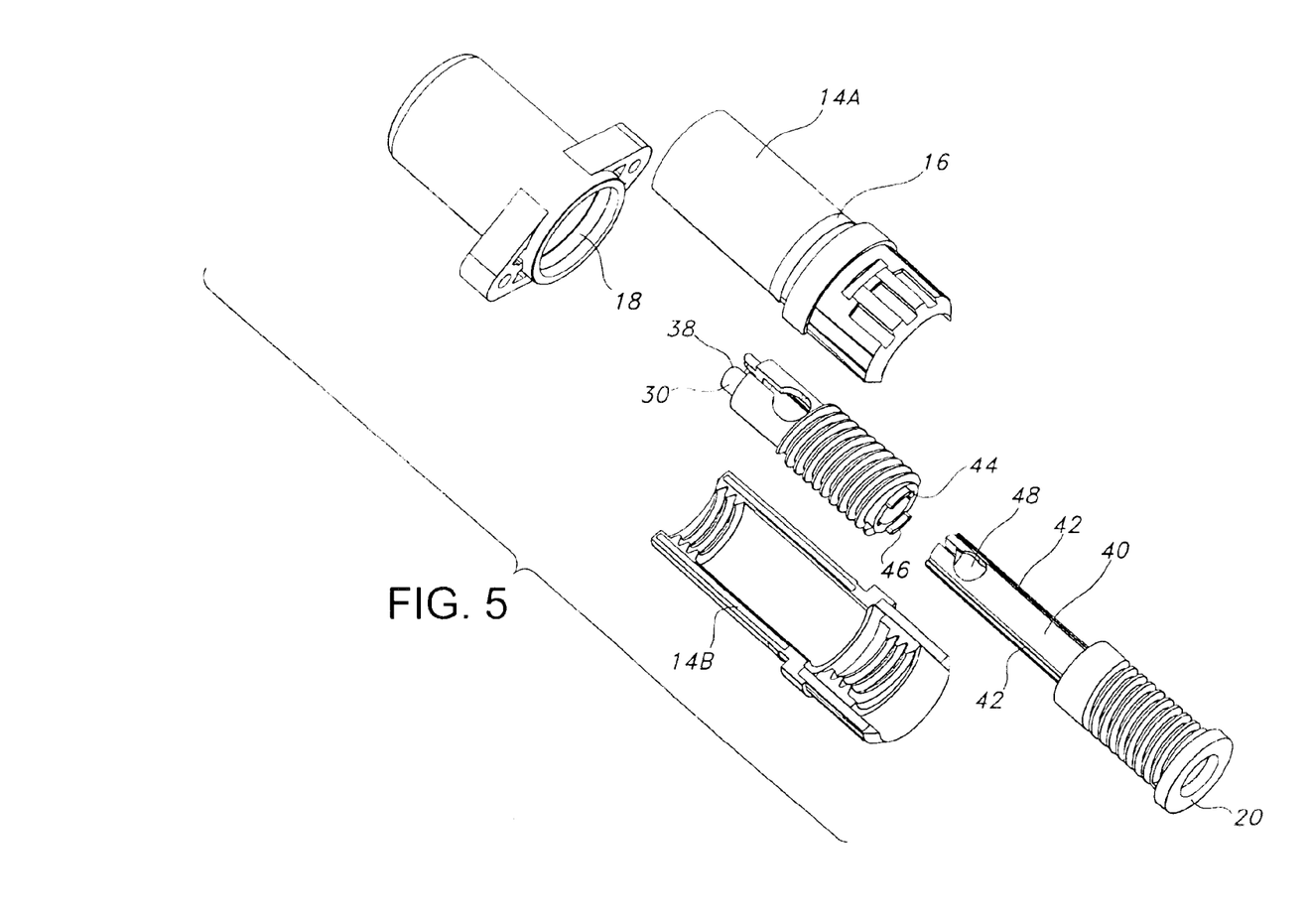
FIG. 5 is an exploded view of the actuator.
Figure 12:
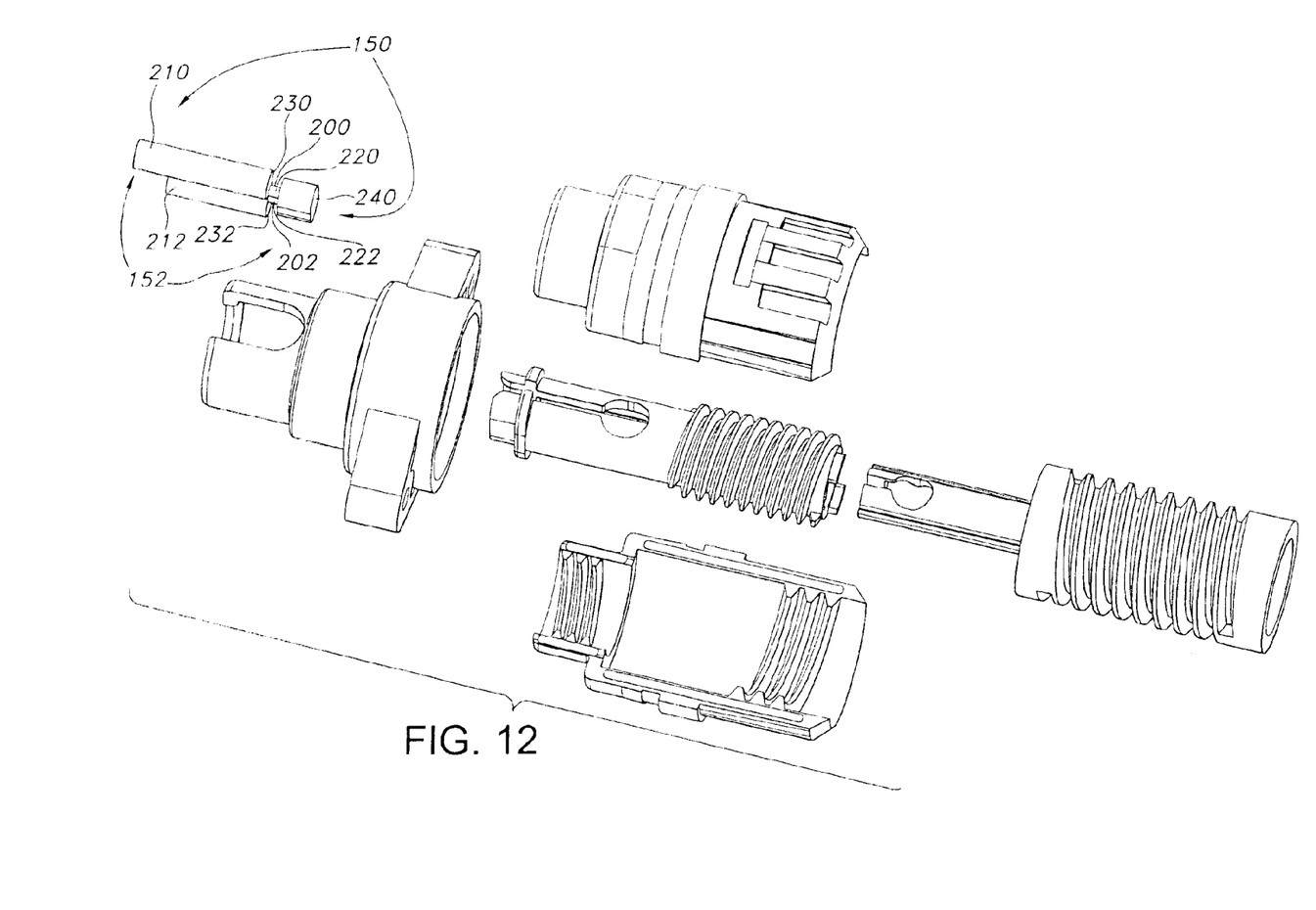
FIG. 12 is an exploded view of the telescoping actuator.

FIG. 5 is an exploded view of the actuator. In FIG. 5 additional aspects of the actuator are visible. Shaft 40 has longitudinal ribs 42, which fit into longitudinal channels 44, in the inside diameter of hollow inner lead screw 30. The sliding of ribs 32 along interlocking channels 44 insure that lead screws 20 and 30 translate longitudinally in and out and do not rotate upon rotation of nut 14. Also visible on FIG. 5 is Bowden cable 150, 152 (see FIGS. 10–12) wire bullet seat 48. Bowden cable wires 200, 202 slide axially through Bowden cable sleeves 210, 212. On the end 220, 222 of the Bowden cable wires and extending slightly beyond the end 230, 232 of the sleeves are "bullets," which are bosses or any other variety of end stops 240 that are wider than the Bowden cable sleeve channel, to prevent the wire sliding out of the Bowden cable, and also for anchoring the Bowden wire end. Seat 48 in shaft 40 receives the wire end bullet in order to hold it in place and apply tension to it.

Inner lead screw 30 has a collar 38 which engages the Bowden cable sleeve end and anchors it for the application of tension.

In operation, a seat occupant manually turns nut 14. Nut threads 24 and 34 engage threads 22 and 32 of outer lead screw 20 and inner lead screw 30. Because the threads of the lead screws run in opposite directions, turning the nut 14 will drive the inner and outer lead screws away from each other and outwards relative to the nut 14 in housing 10. Driving outer lead screw 20 outward exerts tension on a Bowden cable wire through the wire seating at seat 48. The opposite end of the Bowden cable wire will be drawn inwards towards the opposite end of the Bowden cable sleeve, which actuates movement of the ergonomic device.

In the prior art a similar tension is exerted to draw a Bowden cable wire axially through a Bowden cable sleeve in order to actuate the ergonomic device. However, in the prior art the Bowden cable sleeve end was held in static position. In the actuator of the present invention, inner lead screw 30 moves inward relative to the seat (and outward relative to the actuator housing 10) simultaneously with the opposite movement with the outer lead screw 20. This moves the Bowden cable sleeve end, which is anchored at collar 38 of inner lead screw 30, inward towards the seat and further away from its position relative to the Bowden cable wire end, anchored in seat 48. It is the increasing separation of the Bowden cable sleeve end from the Bowden cable wire end that achieves the desired tension at the opposite end of the Bowden cable needed to actuate the ergonomic device. By moving both the sleeve end and the wire end simultaneously and in opposite directions, the same degree of rotation put on the nut 14 achieves twice as much separation between the sleeve end and the wire end as would have been achieved by prior art actuators, which only moved the wire end and not the sleeve end. Accordingly, the same degree of tension can be put on the ergonomic device at the other end of the Bowden cable with half the number of rotations by the seat occupant of the nut 14. This increased convenience to the user has value in the market place.

Typical thread pitches for manual actuators already in production may be in the range of about 2.5 millimeters of linear travel per rotation. It is known to double this pitch by using double lead in threading, which yields a pitch of substantially about 5 millimeters of linear travel per revolution of the nut. Double threading is simply die cutting screw and nut with two helically intersperced threads. Whereas a single thread manual actuator may yield 7.5 millimeters of lumbar support travel in, for example, three rotations, a double threaded variety would yield 15 millimeters of travel in three rotations. The present invention at least doubles this ratio, allowing 30 millimeters of lumbar support travel with three turns of the double threaded manual actuator nut in the telescoping actuator disclosed herein. Thirty millimeters represents the complete range of travel for many lumbar supports.

Exploded view 5 also illustrates aspects of the invention that promote ease of assembly. Nut 14 is split into two halves, 14A and 14B so that lead screws 20 and 30 may be laid into their proper place in the threads on the inner aspect of nut 14. Outer lead screw 20 has a shaft 40 inserted into the inner channel of inner lead screw 30 by an assembler. Proper spacing between outer lead screw 20 and inner lead screw 30 before assembly is insured and maintained by bosses 46 on the outer aspect of the inner lead screw 30. The lead screws 20 and 30 are then laid into the threads of half the nut 14B by an assembler. Thereafter the other half of the nut 14A is laid over the lead screws and the entire assembly is inserted into housing 10 until ring 16 snaps into collar 18.

Space saving is a constant priority for automotive passenger compartment components. Inside a seat, passenger comfort devices have proliferated, including ergonomic supports, heating and cooling ducts, and the like. Outside the seat, lower profile seat controls simplify interior design and are more convenient for passengers by virtue of not obstructing seat belts, coats, and the like. FIGS. 6 through 12 illustrate a more compact alternative embodiment of the present invention. This embodiment saves space by telescoping one lead screw into the other.

Figure 6:
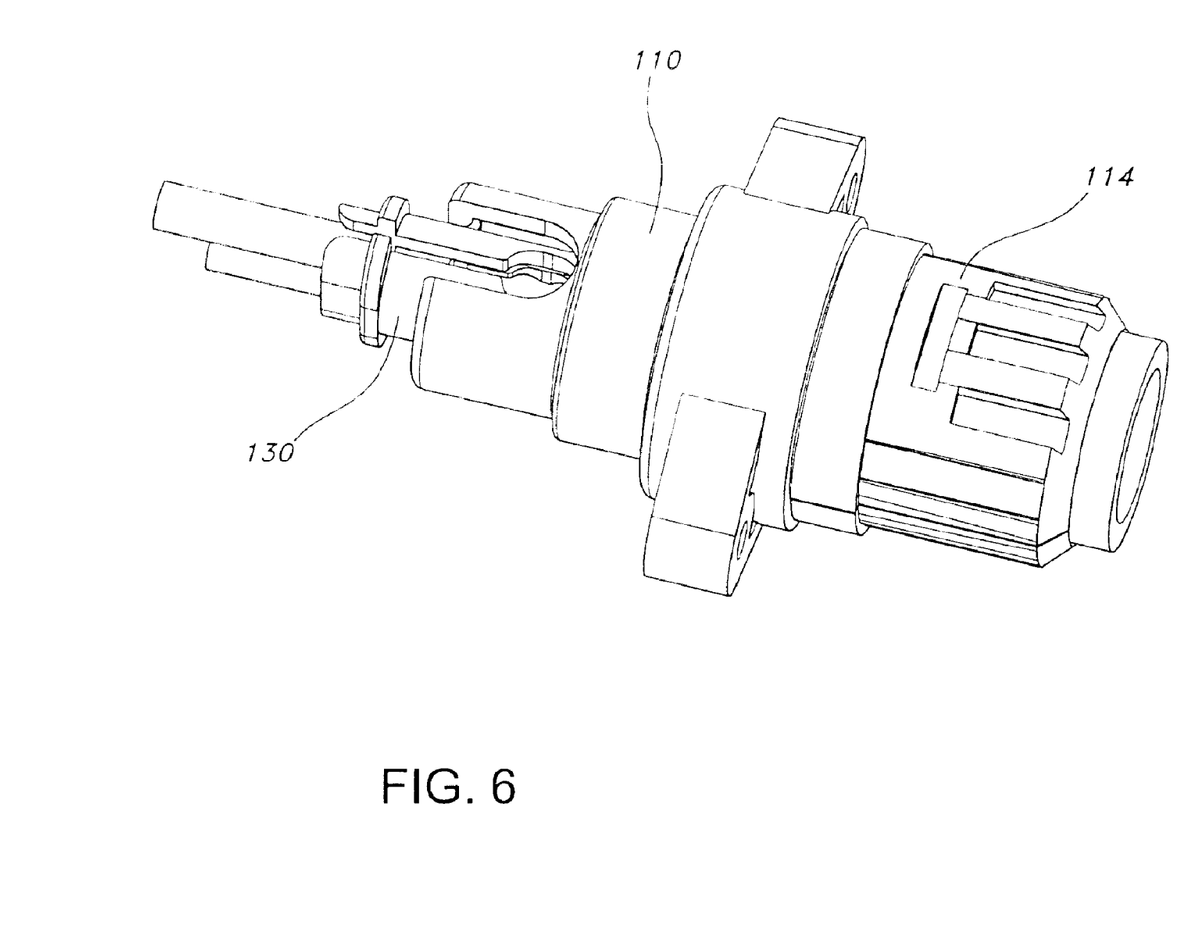
FIG. 6 is a perspective view of the telescoping embodiment of the actuator, in an untensioned position.
Figure 7:
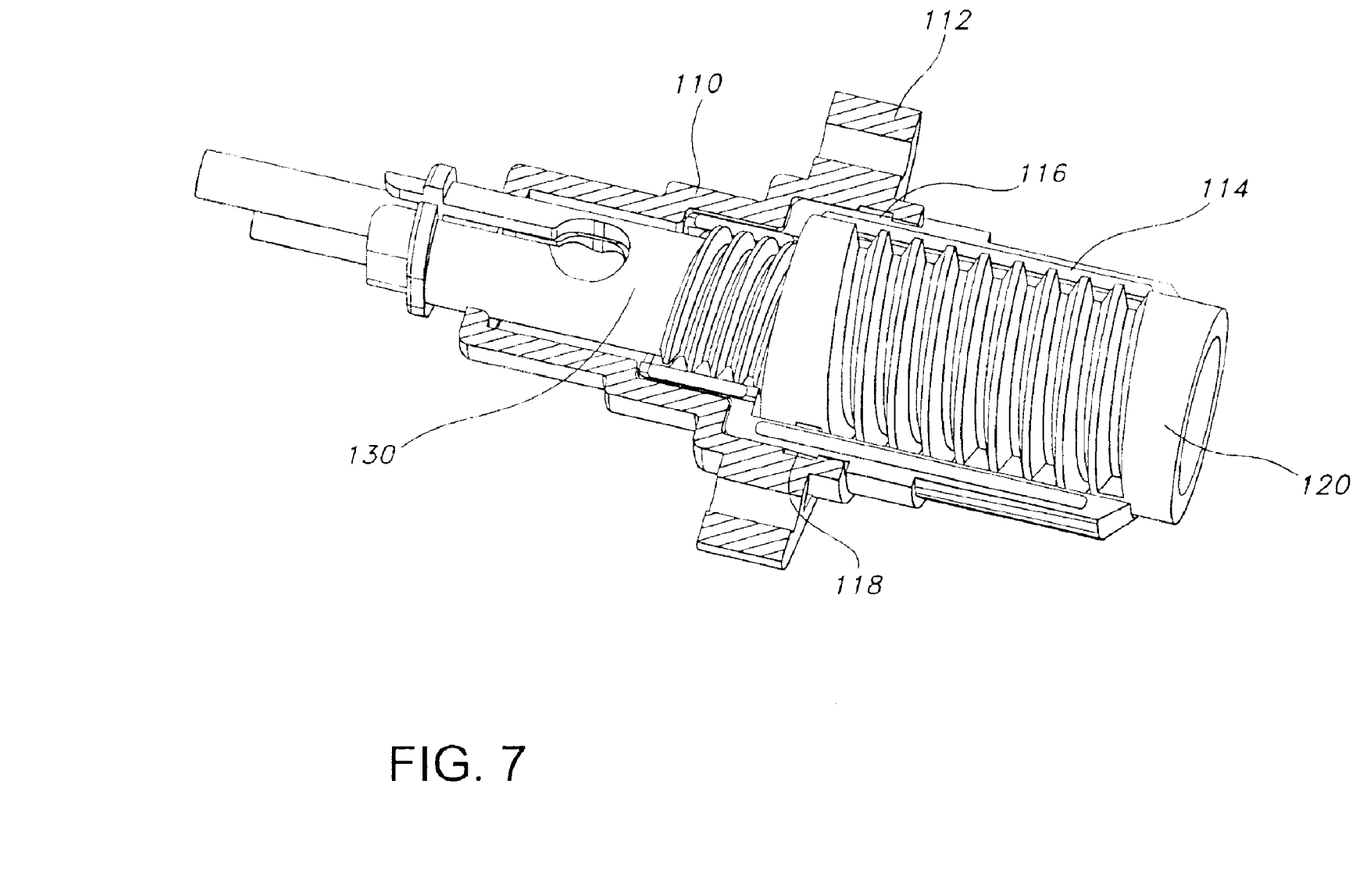
FIG. 7 is a cut away perspective view of the telescoping embodiment of the actuator in an untensioned position.

FIG. 6 is a perspective view of the assembled telescoping actuator in a contracted, untensioned position. FIG. 7 is a cut away perspective view of the same embodiment in the same position. As can be seen, housing 110 and nut 114 are shorter in their axial dimension than the previously depicted embodiment.

This space saving is made possible by the innovation of telescoping one of the lead screws into the other. In this case, the outer lead screw 120 has an inner cylindrical opening dimensioned to receive insertion of the outer diameter of inner lead screw 130. Accordingly, the overall length of the unit may be reduced by the extent to which the inner lead screw may be inserted or telescoped into the outer lead screw 120. Either lead screw may telescope into the other. The inner aspect of the female lead screw may be a smooth, or threaded to engage the male lead screw.

Figure 8:
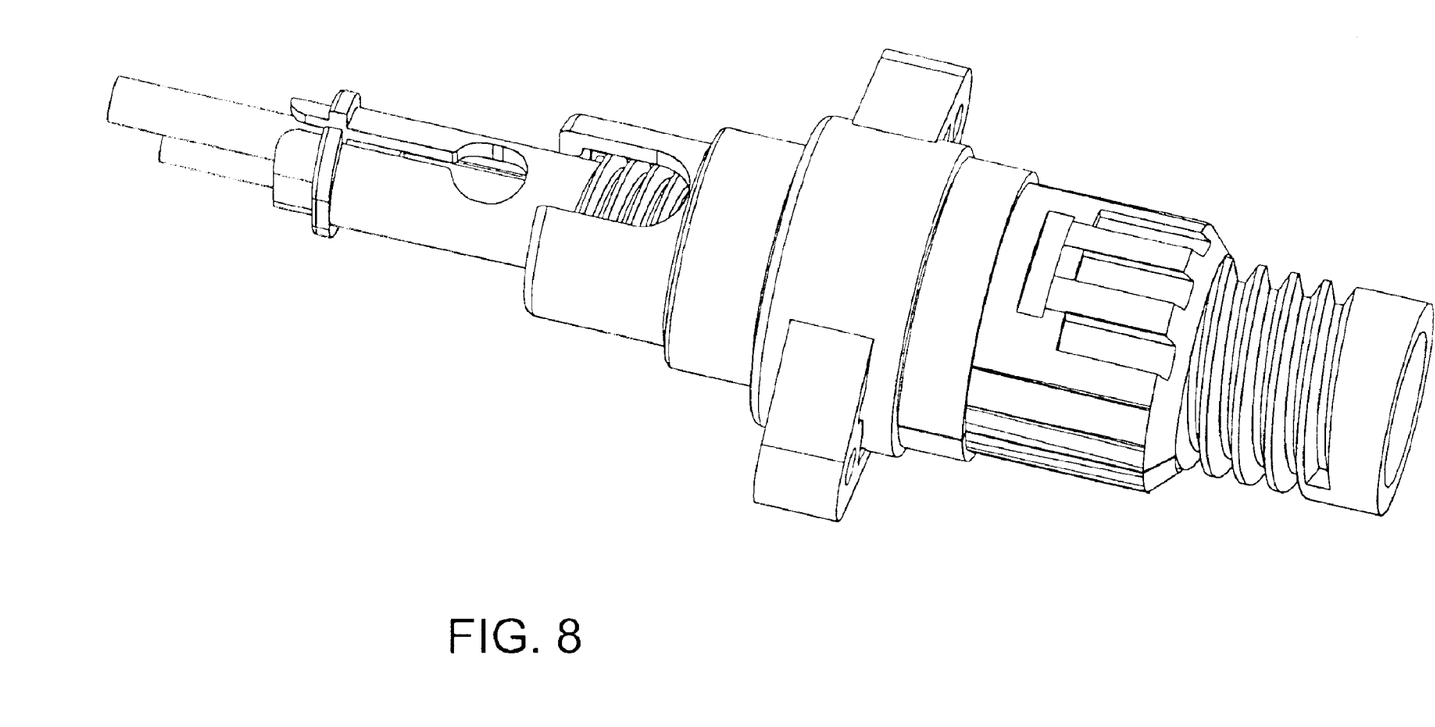
FIG. 8 is a perspective view of the telescoping actuator in an expanded, tensioned position.
Figure 9:
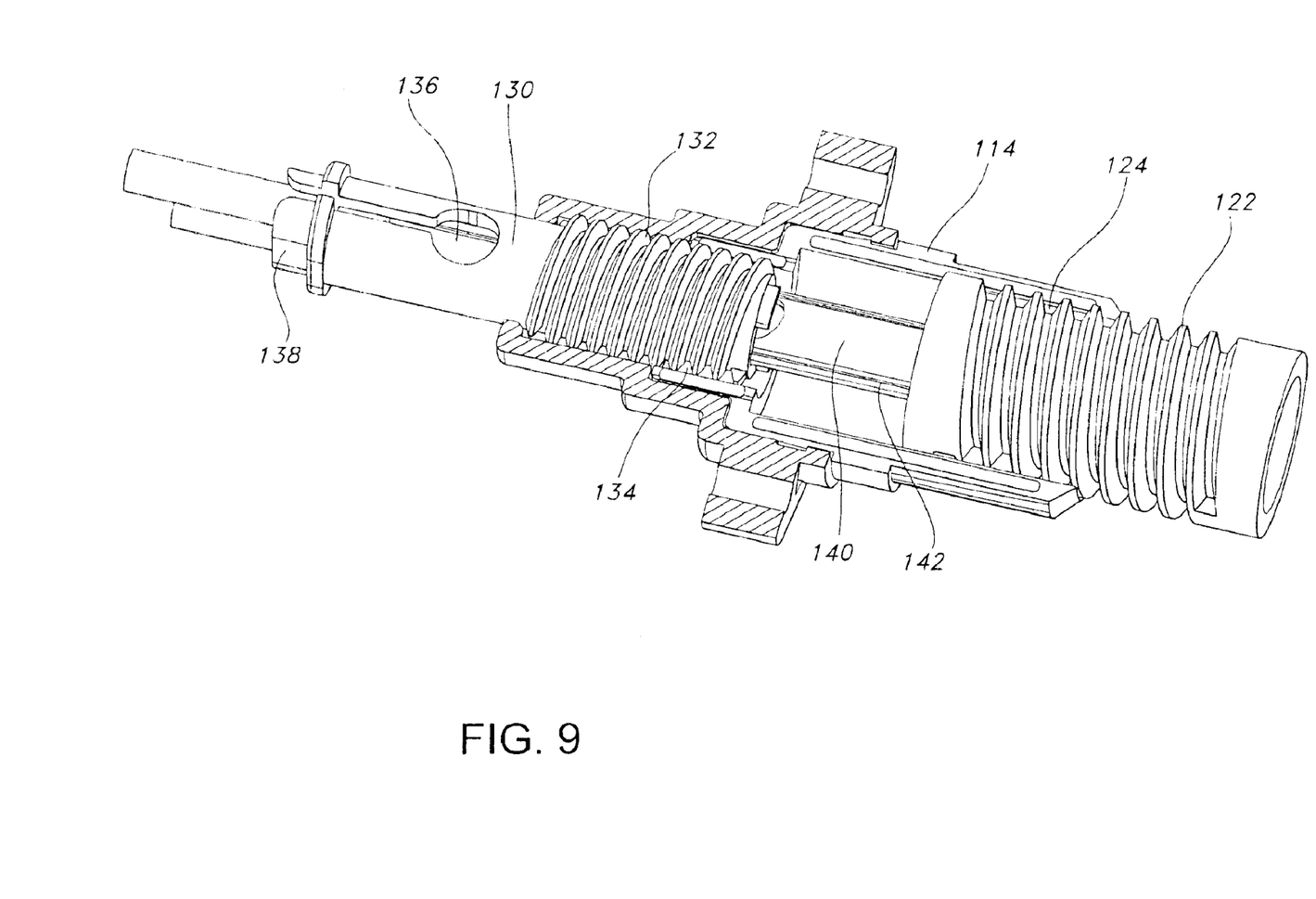
FIG. 9 is a cut away perspective view of the telescoping actuator in an expanded, tensioned position.

FIG. 8 is a perspective view of the telescoping actuator in its extended or tensioned position. FIG. 9 is a cut away perspective view of the telescoping actuator in the same position. As can be seen in FIGS. 7 and 9, the interaction of the components is the same as in the previous embodiment. Nut 114 has threads 124 and 134 engaged with outer lead screw threads 122 and inner lead screw threads 132. Shaft 140 has ribs 142 preventing rotation of the outer lead screw. Flange 116 seats within annular detent 118. Housing bosses 112 support mounting screw shafts. Inner lead screw 130 has a Bowden cable wire and wire bullet insertion slot 136. Inner lead screw 130 also has a Bowden cable sleeve mounting collar 138.

Figures 10, 11:
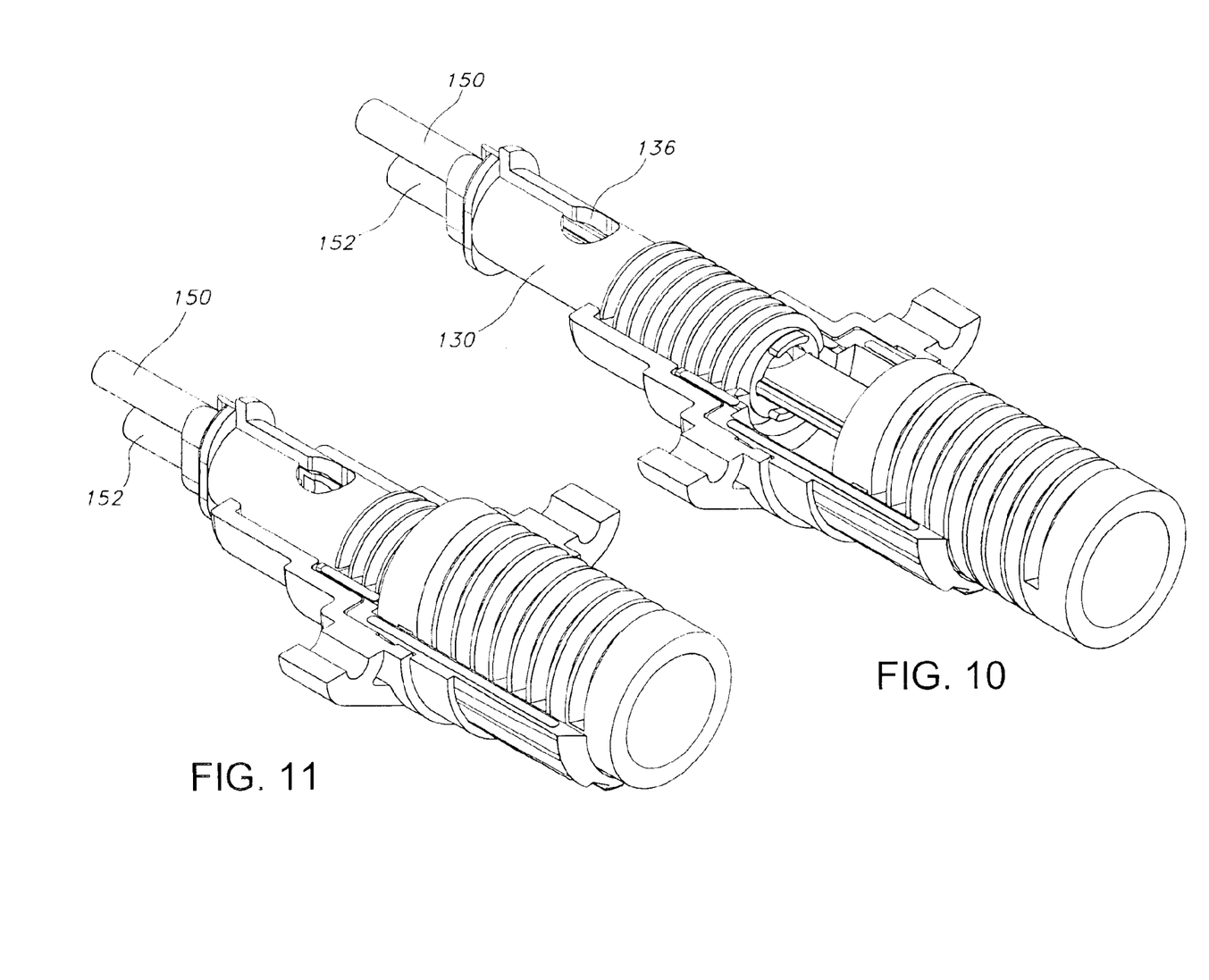
FIG. 10 is another cut away perspective view of the telescoping actuator in an expanded, tensioned position.
FIG. 11 is another cut away perspective view of the telescoping actuator in a closed, untensioned position.

FIG. 10 is also a cut away perspective view of the telescoping actuator in its extended, tensioned position, from a different angle. FIG. 11 is a cut away perspective view of the telescoping actuator in its untensioned position from the second angle.

FIGS. 6 through 12 also illustrate another capability of the present invention, which is the actuation of two Bowden cables simultaneously with a single actuator. As is best seen in FIGS. 10 and 11, the inner lead screw 130 accepts insertion of two Bowden cables 150, and 152. Bowden cable wire and wire bullet insertion slot 136 on the top surface of inner lead screw shaft 130 is mirrored by a corresponding insertion slot (obscured) on the bottom surface of inner lead screw shaft 130. Since the lead screws only translate, and do not rotate, it is well within the capabilities of the present invention to actuate two (or more) Bowden cables simultaneously.

The components of the present invention are preferably plastic, most preferably polyurethane. Various components will be comprised of various formulations of polyurethane as for example seeking a higher glass fill content in the housing 10 in order to stiffen it for rigidity and acceptance of self seating mounting screws. The nut 14 and lead screws 20 and 30 more preferably have a slicker formulation of polyurethane, for example nylon 66, to achieve the desired coefficient of friction. Ease of use and maintenance of position are achieved in the depicted embodiments with the coefficient of friction between the nut threads 24 and 34 and the lead screw threads 22 and 32 in a range from about 0.08 to about 0.14.

The depicted embodiments are shown with screw thread dimensions empirically found to work well with lumbar supports currently marketed, in view of the tensions created by those lumbar supports on Bowden cables and the wire that slides through them. The depicted embodiments have a screw thread pitch of 2.48 millimeters, a lead of 4.96 millimeters, a basic thread thickness at the pitch of 1.23 millimeters, a basic flat at the crest of 0.57 millimeters, a root flat thickness of 0.57 millimeters, a major diameter of 15.9/15.6 millimeters, a pitch diameter of 14.45/14.15 millimeters and minor diameter of 12.84/12.54 millimeters in a basic thread height of 1.53 millimeters. For these screw dimensions, it is found to be beneficial and efficient to mix the polyurethane used for the lead screw and nut to yield a coefficient of friction in the range from about 0.08 to about 0.14. It is contemplated to within the scope of this invention that other pitch dimensions and other coefficients of friction may optimize the mechanical efficiency of the disclosed novel design should the actuator be applied for use with tensioning cables other than the currently used Bowden cable, lumbar supports other than the currently used lumbar supports, or different dimensions of the mechanical aspects of the novel designs disclosed.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

What is claimed is:

1. An ergonomic device actuator comprising:
   a housing;
   a nut disposed to rotate within said housing, said nut having right handed threads at a first end of said nut and said nut having left handed threads at a second end of said nut;
   a first lead screw having right handed threads disposed to translate in a first direction within said nut and being extendingly engaged with said first end of said nut;
   a second lead screw having left handed threads disposed to translate in a second direction within said nut and being extendingly engaged with said second end of said nut;
   a seat in one of said first or second lead screws adapted to anchor a tension cable wire end axially with said first and second lead screws; and
   a collar on the other of said first or second lead screws adapted to anchor a tension cable sleeve end axially with said first and second lead screws;
   whereby rotation of said nut drives said first lead screw and said second lead screw apart, tensioning the tension cable by urging the tension cable wire end apart from the tension cable sleeve end.

2. The actuator of claim 1 wherein said first lead screw telescopes into said second lead screw.

3. The actuator of claim 1 wherein said second lead screw telescopes into said first lead screw.

4. The actuator of claim 1 wherein one of said first or second lead screws telescopes into the other of said first or second lead screws with a threaded engagement.

5. The actuator of claim 1 wherein the tension cable is a Bowden cable.

6. The actuator of claim 1 wherein said second lead screw includes an installation slot adapted to accept installation of a Bowden cable end bullet.

7. The actuator of claim 1 wherein said housing further comprises an annular detent, and wherein said nut further comprises a ring, said ring being seated within said annular detent and said annular detent retaining said nut within said housing as said nut rotates therein.

8. The actuator of claim 1 wherein the coefficient of friction between said threads on said nut and said threads on said first lead screw and between said threads on said nut and said threads on said second lead screw is in the range from about 0.08 to about 0.014.

9. The actuator of claim 1 wherein further comprising a second seat for a second Bowden cable wire end and a second anchor for a second Bowden cable sleeve.

10. The actuator claim 1 wherein one rotation of said nut corresponds to 10 mm of Bowden cable wire travel relative to the Bowden cable sleeve.

11. The actuator of claim 1 wherein the pitch of said right handed threads and the pitch of said left handed threads is in a range from about 2.0 to about 3.0.

12. The actuator of claim 1 wherein the pitch of said right handed threads and the pitch of said left handed threads is in a range from about 4.0 to about 6.0.

13. The actuator of claim 1 wherein one of said first or second lead screws has a shaft that inserts into the other of said first or second lead screws.

14. The actuator of claim 13 wherein said shaft has ridges that prevent rotation of said lead screws.

15. The actuator of claim 13 wherein said seat adapted to anchor said tension cable wire end is on said shaft.

16. The actuator of claim 1 wherein said first lead screw, said second lead screw and said nut are double threaded.

17. An actuator for an ergonomic device comprising:
    a housing;
    a nut disposed to rotate within said housing, said nut having right handed threads at a first end of said nut and said nut having left handed threads at a second end of said nut;
    a first lead screw having right handed threads disposed to translate in a first direction within said nut and being extendingly engaged with said first end of said nut;
    a second lead screw having left handed threads disposed to translate in a second direction within said nut and being extendingly engaged with said second end of said nut;
    a seat in one of said first or second lead screws adapted to anchor a tension cable wire end axially with said first and second lead screws; and
    a collar on the other of said first or second lead screws adapted to anchor a tension cable sleeve end axially with said first and second lead screws;
    whereby rotation of said nut drives said first lead screw and said second lead screw apart, tensioning the tension cable by urging the tension cable wire end apart from the tension cable sleeve end, and wherein at least one of said first and second lead screws further comprise at least one of:
    a shaft from said first lead screw inserted into said second lead screw;
    a shaft from said second lead screw inserted into said first lead screw;
    a section from said first lead screw telescoping into said second lead screw; and
    a section from said second lead screw telescoping into said first lead screw.

18. The actuator of claim 17 further comprising a means for preventing rotation of said lead screws.

19. The actuator of claim 18 wherein said rotation preventing means comprises a channel and a rib fitting within said channel.

20. The actuator of claim 17 further comprising a means for retaining said set of rotatable threads from translating with respect to said housing.

21. The actuator of claim 17 wherein said housing further comprises an annular detent, and wherein said nut further comprises a ring, said ring being seated within said annular detent and said annular detent retaining said nut within said housing as said nut rotates therein.

22. A device for actuating a support structure comprising:
    a Bowden cable comprising a cable sleeve around a cable wire; and
    an actuator comprising a cable sleeve collar, a cable wire seat, and a set of rotatable threads, said rotatable threads comprising a set of right handed threads and a set of left handed threads, wherein said cable sleeve collar is operatively connected to said cable sleeve and further comprises a first set of threads operatively engaged with said set of rotatable threads, wherein said cable wire seat is operatively connected to said cable wire and comprises a second set of threads oppositely threaded from said first set of threads and operatively engaged with said rotatable threads, and wherein rotation of said rotatable threads translates at least one of said cable sleeve collar and said cable wire seat away from the other one of said cable sleeve collar and said cable wire seat.

23. The actuating device of claim 22 further comprising a housing, wherein said housing comprises a means for retaining said set of rotatable threads from translation.

24. The actuating device of claim 22 wherein said set of rotatable threads is comprised of at least one of a nut and a screw, and wherein said first set of threads and said second set of threads are comprised of at least one of a pair of nuts and a pair of screws.

25. A device for actuating a Bowden cable having a cable sheath enclosing a wire core comprising:
- a cable sleeve collar operatively connected to the cable sheath;
- a cable wire seat operatively connected to the wire core; and
- a means for simultaneously moving said cable sleeve collar in a first direction and said cable wire seat in a second direction opposite from said first direction, wherein the cable sheath is moved in said first direction and said wire core in said second direction.

26. The actuator of claim 25 wherein said moving means comprises:
- a housing comprising an annular detent
- a nut disposed to rotate within said housing, said nut comprising right handed threads, left handed threads and a ring seated within said annular detent;
- a first lead screw engaged with said right handed threads of said nut and disposed to translate respectively thereto, said first lead screw being operatively connected to one of said cable sleeve collar and said cable wire seat; and
- a second lead screw engages with said left handed threads of said nut and disposed to translate respectively thereto, said second lead screw being operatively connected to the other of said cable sleeve collar and said cable wire seat, and wherein at least one of said first and second lead screws further comprise at least one of:
- a shaft from said first lead screw inserted into said second lead screw;
- a shaft from said second lead screw inserted into said first lead screw;
- a section from said first lead screw telescoping into said second lead screw; and
- a section from said second lead screw telescoping into said first lead screw.

* * * * *